United States Patent
Sarkar et al.

(10) Patent No.: US 12,499,321 B2
(45) Date of Patent: Dec. 16, 2025

(54) EMBEDDED CONTEXT EXTRACTION USING NATURAL LANGUAGE MODELS FOR DYNAMIC REMEDIATION

(71) Applicant: International Business Machines Corporation, Armonk, NY (US)

(72) Inventors: Sanmitra Sarkar, Kolkata (IN); Mukundan Sundararajan, Bangalore (IN); Sumitro Ghatak, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 312 days.

(21) Appl. No.: 18/333,355

(22) Filed: Jun. 12, 2023

(65) Prior Publication Data

US 2024/0411999 A1   Dec. 12, 2024

(51) Int. Cl.
| | |
|---|---|
| *G06F 40/35* | (2020.01) |
| *G06F 40/253* | (2020.01) |
| *G06F 40/289* | (2020.01) |
| *G06Q 10/1093* | (2023.01) |
| *G10L 15/18* | (2013.01) |

(52) U.S. Cl.
CPC ............ *G06F 40/35* (2020.01); *G06F 40/253* (2020.01); *G06F 40/289* (2020.01); *G06Q 10/1093* (2013.01); *G10L 15/1815* (2013.01)

(58) Field of Classification Search
CPC ...... G06F 40/35; G06F 40/253; G06F 40/289; G06F 40/279; G06F 40/30; G06Q 10/1095; G10L 15/1815; G10L 2015/088
See application file for complete search history.

(56) References Cited

U.S. PATENT DOCUMENTS

| | | | |
|---|---|---|---|
| 11,501,262 B1 | 11/2022 | Shetty et al. | |
| 2016/0104120 A1* | 4/2016 | Agrawal | G06Q 10/1095 |
| | | | 705/7.19 |
| 2018/0218734 A1 | 8/2018 | Somech et al. | |
| 2019/0180249 A1* | 6/2019 | Connolly | H04L 51/066 |
| 2019/0215288 A1* | 7/2019 | Diriye | H04L 51/18 |
| 2020/0160278 A1* | 5/2020 | Allen | G06Q 10/1095 |

(Continued)

OTHER PUBLICATIONS

Chen-Tung Chen et al., "Applying fuzzy method for measuring criticality in project network," ScienceDirect, Information Sciences 177, Year: 2007, pp. 2448-2458.

*Primary Examiner* — Bhavesh M Mehta
*Assistant Examiner* — Philip H Lam
(74) *Attorney, Agent, or Firm* — Patterson + Sheridan, LLP

(57) ABSTRACT

Method and apparatus for dynamic remediation. A set of records associated with a project is accessed. The set of records is processed using one or more natural language processing techniques to generate textual data comprising a plurality of pairs of sentences corresponding to one or more topics associated with the project. An issue for at least one topic associated with the project is identified based on the textual data, comprising identifying a pair of sentences that comprises a first sentence and a second sentence, calculating a sentence similarity score by comparing the first and second sentences using a similarity metric, and determining that the sentence similarity score satisfies one or more criteria. In response to determining that the one or more criteria are satisfied, a project meeting for the issue is scheduled based at least in part on a criticality of the issue.

20 Claims, 9 Drawing Sheets

(56) References Cited

U.S. PATENT DOCUMENTS

2020/0257763 A1* 8/2020 Marvaniya .............. G06F 40/30
2020/0410997 A1* 12/2020 Bar-On ................... G10L 15/04
2021/0182489 A1* 6/2021 Barkan .................... G06N 3/08
2021/0200515 A1* 7/2021 Rayapati ............... G06F 40/216
2022/0350970 A1* 11/2022 Rizk ................ G06V 30/19007

* cited by examiner

EMBEDDED CONTEXT EXTRACTION USING NATURAL LANGUAGE MODELS FOR DYNAMIC REMEDIATION

BACKGROUND

The present disclosure relates to dynamic remediation, and more specifically, to a method of extracting and analyzing embedded context for dynamic remediation efforts.

Efficient issue identification is largely dependent on the ability to process and analyze massive volume of data, encompassing structured data, semi-structured data and/or natural language data. However, the increasing amount of data being received and stored, combined with its complexity and inconsistent formatting (such as textual data, graph data, or audio/video data), poses significant challenges to effective evaluation and issue identification processes. As a result, there is an escalating demand for the development of a more effective data processing and analytical mechanism that can identify and resolve problems in their early phases.

The present disclosure relates to an automated system for using computational models to effectively process large amount of data, accurately extract embedded context, efficiently identify early-stage problem, and automatically take proactive actions. The system provides a more efficient and intelligent project management process, allowing for faster and more dynamic issue identification and improving the overall workflow efficiency.

SUMMARY

One embodiment presented in this disclosure provides a method, including accessing a set of records associated with a project, processing the set of records, using one or more natural language processing techniques, to generate textual data comprising a plurality of pairs of sentences corresponding to one or more topics associated with the project, identifying an issue for at least one topic associated with the project based on the textual data, which comprises identifying a pair of sentences from the plurality of pairs of sentences, where the pair of sentences comprises a first sentence and a second sentence, calculating a sentence similarity score by comparing based on the first and second sentences using a similarity metric, and determining that the sentence similarity score satisfy one or more criteria, and in response to determining that the one or more criteria are satisfied, scheduling a project meeting for the issue based at least in part on a criticality of the issue. One advantage provided by such an embodiment is more efficiently processing large amounts of data to extract embedded context. Further, based on the extracted embedded context, the disclosed embodiment may identify early-stage problems and take proactive action automatically.

Other embodiments in this disclosure provide non-transitory computer-readable mediums containing computer program code that, when executed by operation of one or more computer processors, performs operations in accordance with one or more of the above methods, as well as systems comprising one or more computer processors and one or more memories containing one or more programs which, when executed by the one or more computer processors, performs an operation in accordance with one or more of the above methods.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DETAILED DESCRIPTION

Figure 1:
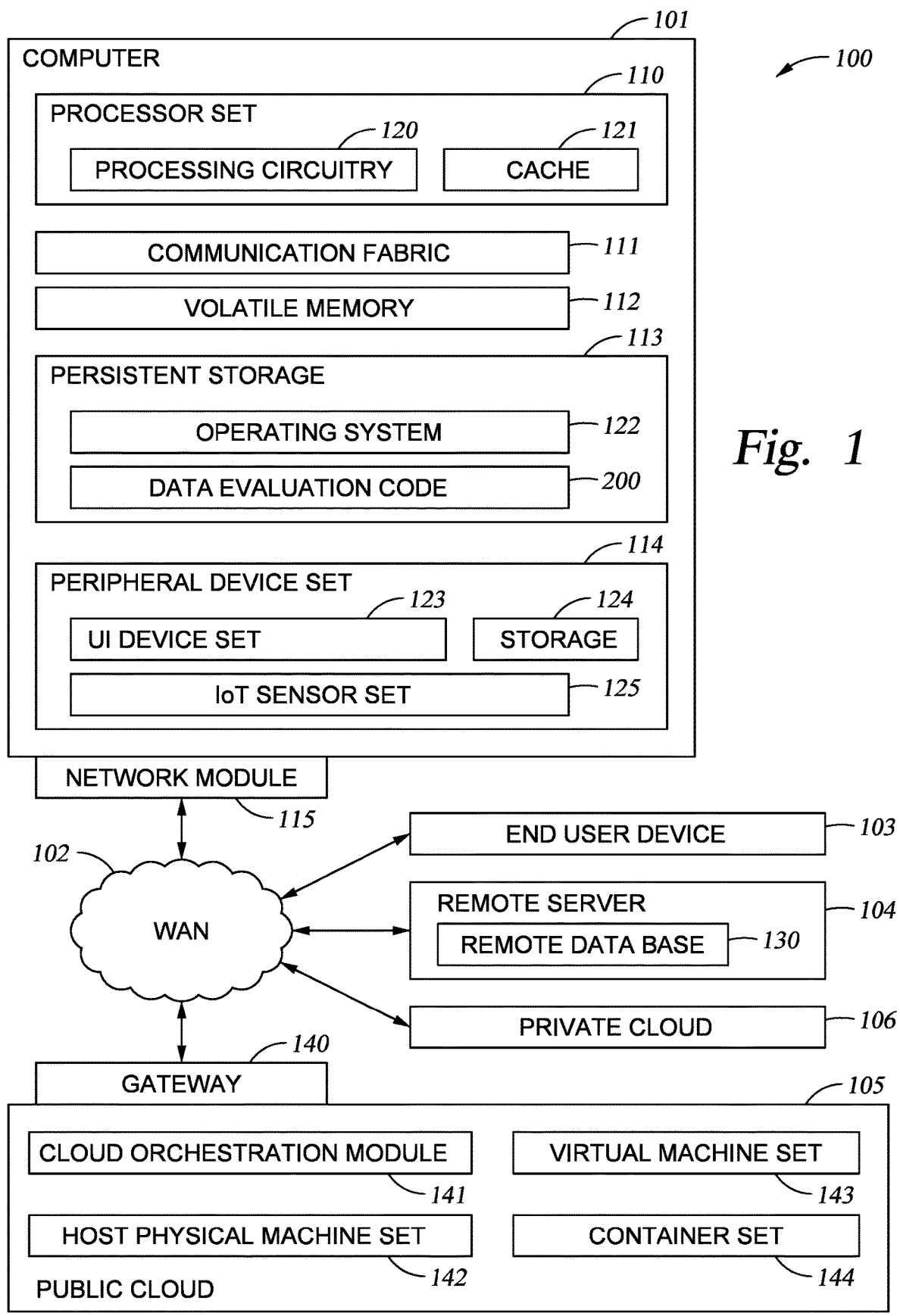
FIG. 1 depicts an example computing environment for the execution of at least some of the computer code involved in performing the inventive methods.

The descriptions of the various embodiments of the present invention are presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments herein describe an automated system that uses natural language processing (NLP) techniques and machine learning models to identify issues (such as contradictions) reflected in different formats of data (such as unstructured data, semi-structured data, or structured data). For example, in the context of execution of a project, embodiments of the present disclosure may be used to identify potential concerns or issues, such as problems that may impact progress or completion of the project. In some embodiments, issues for managing or completing a given project are identified by detecting contradictory facts or statements in the natural language communications between different team members. The natural language communications may include, for example, emails, chat logs, video/audio meeting records, and/or other types of documents related to the project. In some embodiments, contradictory facts (or issues) may be detected by extracting a plurality of pairs of sentences from the text-based communications, and calculating a similarity/coherence scores between each pair of sentences using a similarity metric. When the similarity/coherence score reaches a pre-defined threshold, an issue is identified. In some embodiments, identified issues can be categorized based on their criticalities or impacts on the project's progress and completion. For example, an issue that arises from a critical path (such as major budget overruns, or delays in completing critical tasks) and may stop a project's progress or block a project's delivery may be assigned to a high criticality category, and immediate actions should be taken (such as promptly scheduling a project meeting, escalating the issue to higher levels of management) to resolve this issue. An issue that arises from a non-critical path (such as minor technical problems, or delays in completing non-critical tasks) and may impede or slow down a project's progress may be categorized as medium or low criticality, and appropriate actions (such as scheduling a project meeting within the next two weeks) may be taken to address this issue. Though some examples discussed herein refer to evaluating data to predict issues and schedule remediation activities for ongoing projects, embodiments of the present disclosure are readily applicable to a wide variety of environments where different formats of data can be evaluated to automatically identify issues reflected in the data.

FIG. 1 depicts an example computing environment 100 for the execution of at least some of the computer code involved in performing the inventive methods.

Computing environment 100 contains an example of an environment for the execution of at least some of the computer code involved in performing the inventive methods, such as Data Evaluation Code 200. In addition to Data Evaluation Code 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and Data Evaluation Code 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in Data Evaluation Code 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in Data Evaluation Code 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
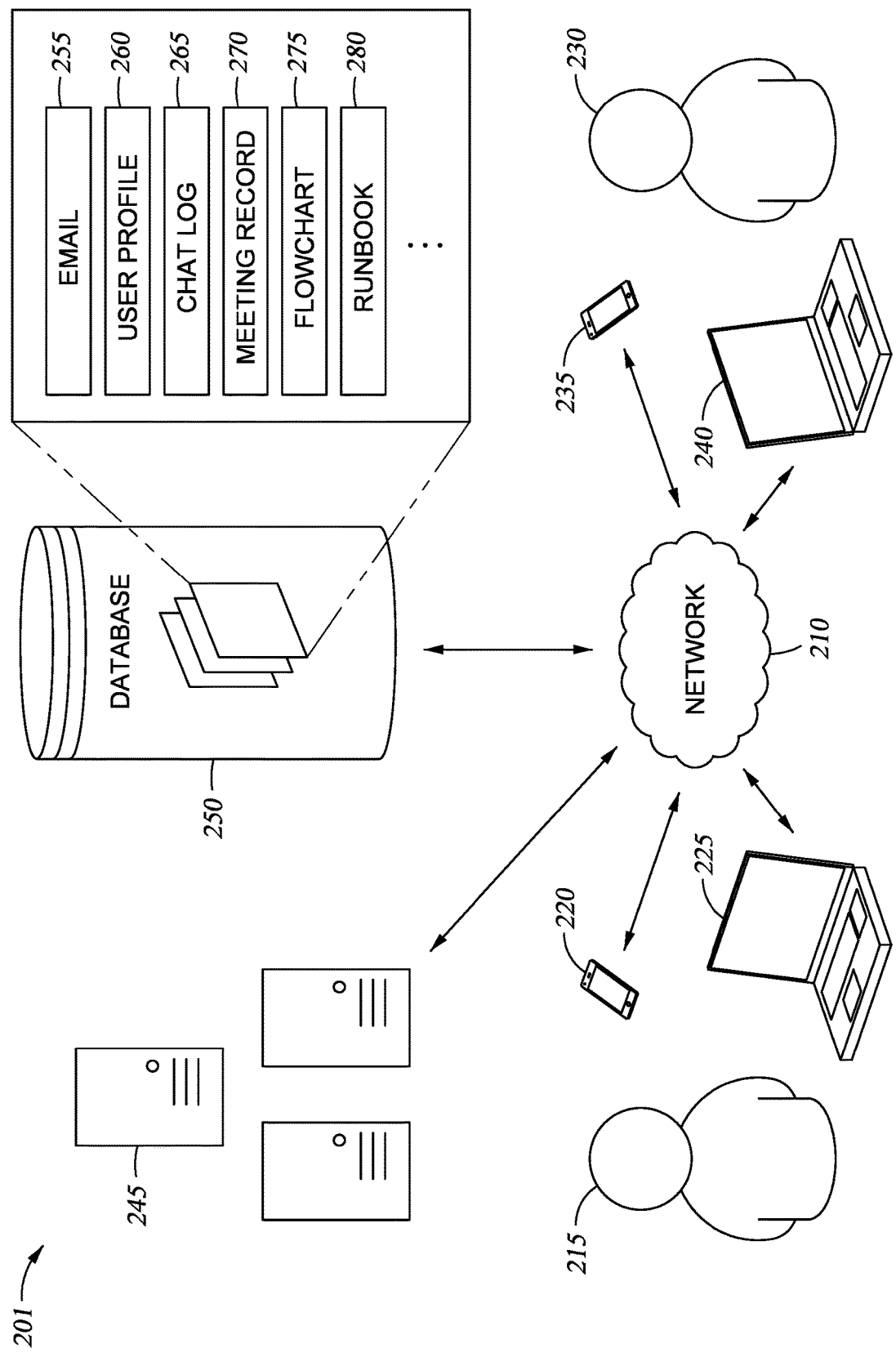
FIG. 2 depicts an example computing system for correlating data for a given project provided by different users, according to some embodiments of the present disclosure.

FIG. 2 depicts an example computing system for correlating data for a project provided by different users, according to some embodiments of the present disclosure. As shown, the system 201 includes a first user 215 (also referred to in some embodiments as a team member or project member), the first user's associated user devices 220 and 225, a second user 230, the second user's associated user devices 235 and 240, one or more servers 245, a database 250, and a network 514. In some embodiments, one or more of the illustrated devices may be a physical device or system. In other embodiments, one or more of the illustrated devices may be implemented using virtual devices, and/or across a number of devices.

Although two users 215 and 230 are shown, in some embodiments, the system 201 may include more than two users. The user devices (e.g., 220, 225, 235 and 240) generally enable a user (e.g., 215 and 230) to communicate with the database 250 (e.g., via network 210). The user devices (e.g., 220, 225, 235 and 240) can be any type of computing device that can send and/or retrieve data to and from the database 250. In some embodiments, the user devices (e.g., 220, 225, 235 and 240) may correspond to conventional computing devices, such as laptops, desktops, tablets, smart phones, industrial sensors, etc. In some embodiments, the user devices may include a CPU, a memory, a storage, one or more network interfaces, and one or more I/O interfaces, where the CPU may retrieve and execute programming instructions stored in the memory, as well as store and retrieve application data residing in the storage.

In the illustrated example, the server 245, the database 250, the user devices (e.g., 220, 225, 235, and 240) are remote from each other and communicatively coupled to each other via a network 210. That is, the server 245, the database 250, the user devices (e.g., 220, 225, 235, and 240) may each be implemented using discrete hardware systems. The network 210 may include or correspond to a wide area network (WAN), a local area network (LAN), the Internet, an intranet, or any combination of suitable communication medium that may be available, and may include wired, wireless, or a combination of wired and wireless links. In some embodiments, the server 245, the database 250, the user devices (e.g., 220, 225, 235, and 240) may be local to each other (e.g., within the same local network and/or the same hardware system), and communicate with one another using any appropriate local communication medium, such as a local area network (LAN) (including a wireless local area network (WLAN)), hardwire, wireless link, or intranet, etc.

In the illustrated example, each user device (e.g., 220, 225, 235, and 240) can be used to create, access, and/or store various data that can be evaluated to track a project's progress, including text-based records (e.g., emails, chat logs, project runbooks, forum postings, meeting minutes, project plans, status reports, task lists, etc.), video/audio records (e.g., project meetings between team members), graph-based records (e.g., flowcharts, diagrams, mind maps, Gantt charts, etc.), and the like. The project-related data saved on and/or accessed via each local user device may be associated with user profiles 260 (which may specifically identify the particular associated user), and the data and user profile 260 may be transmitted or provided together to the database 250. For example, project-related data saved on the user device 225 (or another system, such as a cloud repository or server) may be associated with user 215, and transmitted continuously (e.g., as it is created or updated) or periodically to update the database 250. As shown, the database 250 receives and stores the project-related data associated with different users and/or user devices (e.g., 220, 225, 235, 240), and reformats and/or reorganizes the project-related data into different categories, such as emails 255, user profiles 260, chat logs 265, meeting records 270, flowcharts 275, project runbooks 280, etc.

In some embodiments, that the server 245 may extract and evaluate the data from database 250, as discussed in more detail below, to identify issues, rank criticality, schedule meetings, and the like.

Figure 3A:
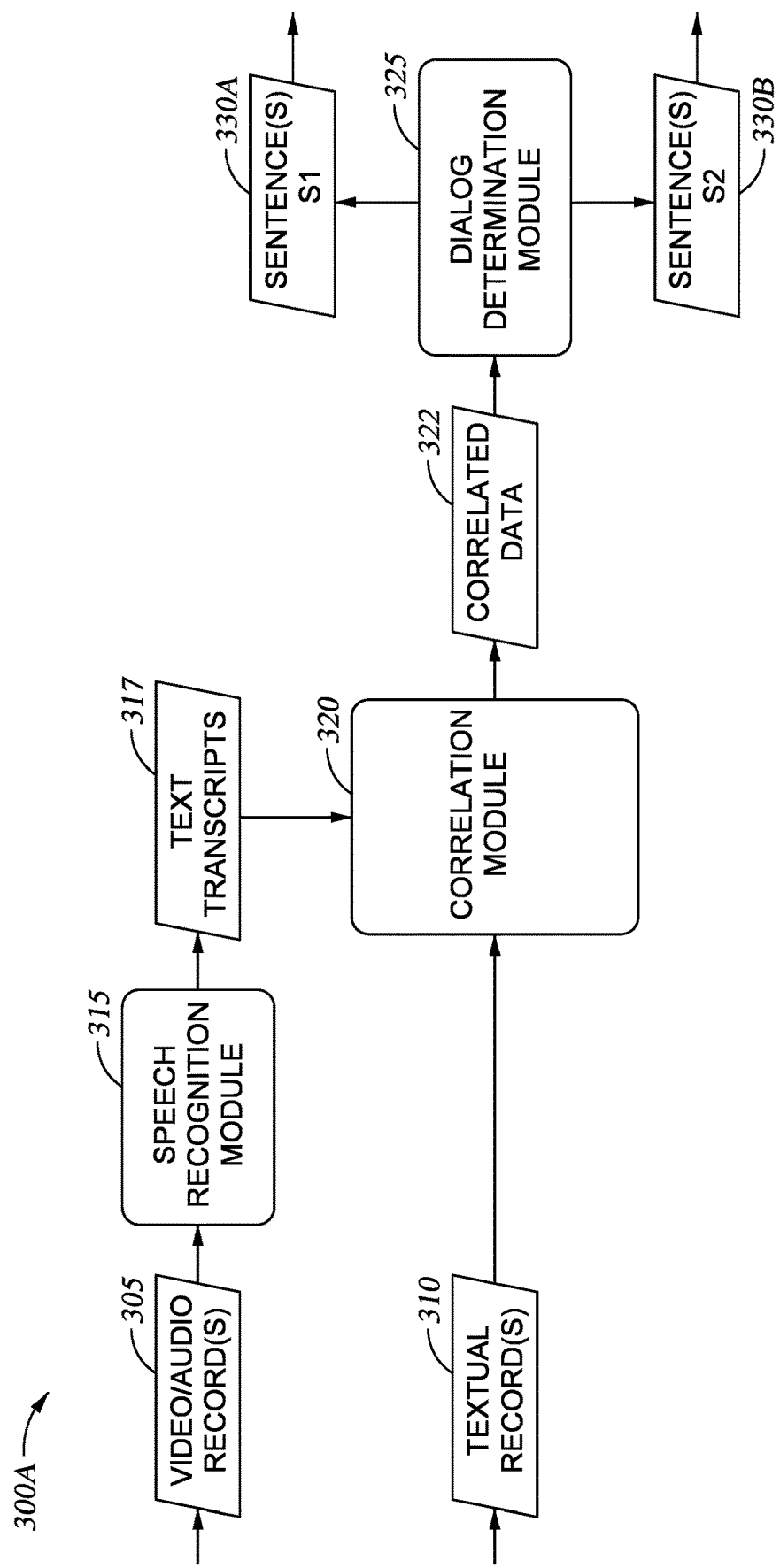
FIG. 3A-3B depicts an example workflow for using computational models to evaluate data and drive dynamic scheduling, according to some embodiments of the present disclosure.
Figure 3B:
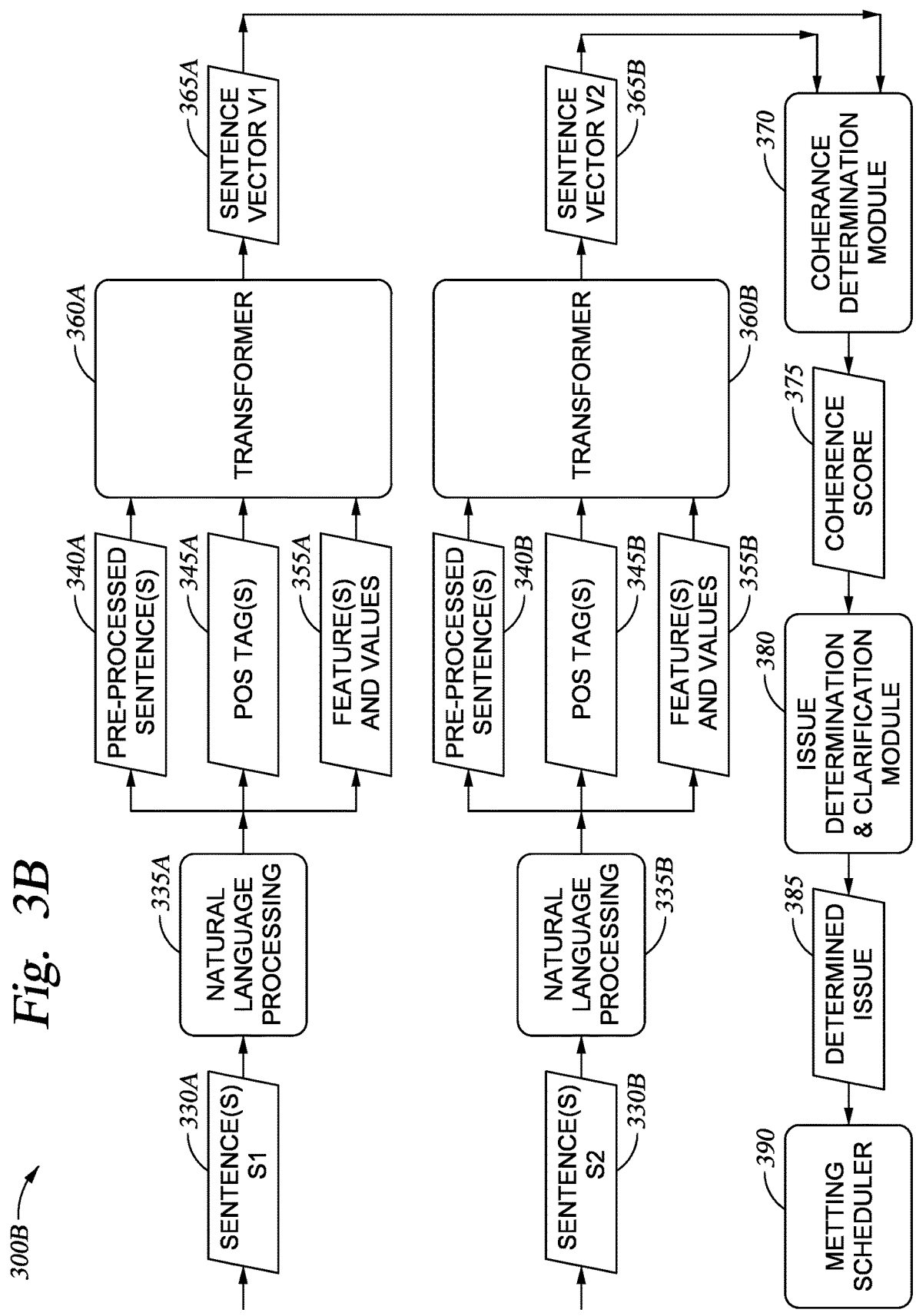

FIG. 3A-3B depict an example of a workflow for using computational models to evaluate data and drive dynamic scheduling, according to some embodiments of the present disclosure. In some embodiments, the workflow 300A (depicted in FIG. 3A) may be performed by one or more computing systems, such as a user device (e.g., user devices 220, 225, 235, and/or 240 of FIG. 2), a server (e.g., the server 245 of FIG. 2), or another computing system (e.g., computing system 700 of FIG. 7). Though depicted as discrete components for conceptual clarity, in some embodiments, the operations of the depicted components (and others not depicted) may be combined or distributed across any number and variety of components, and may be implemented using hardware, software, or a combination of hardware and software.

Figure 7:
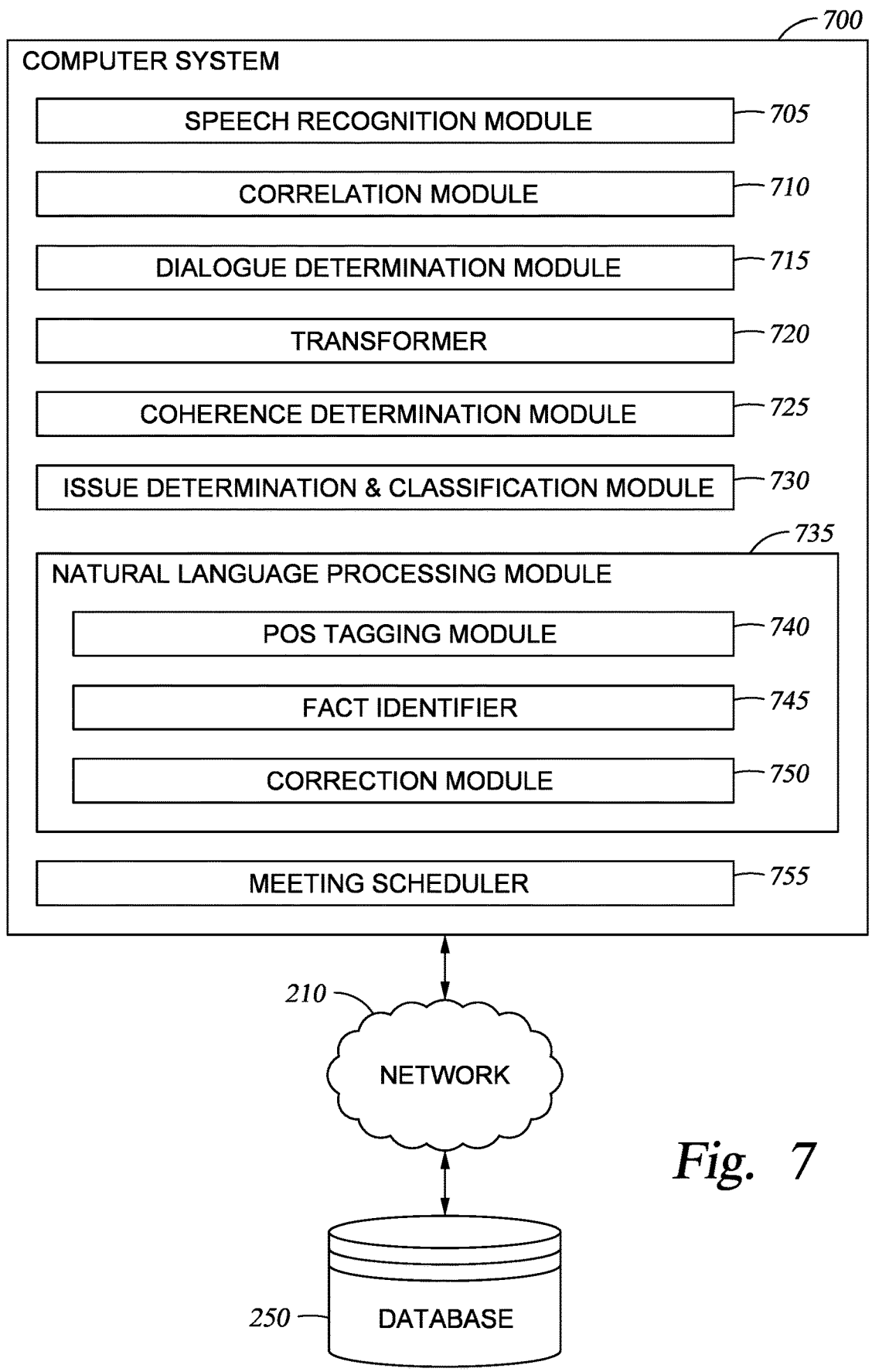
FIG. 7 depicts an example computing system for automated issue identification and dynamic scheduling, according to some embodiments of the present disclosure.

In the illustrated example, video/audio records 305 (e.g. project meetings between team members) from different users and/or user devices (e.g., 225) are processed by the speech recognition module 315 (which may correspond to the speech recognition module 705 of FIG. 7), which converts the speech in video/audio records 305 into text 317 using one or more speech-to-text algorithms/models. The audio/video records 305 may come from a variety of sources, such as project kick-off meetings, weekly project update meetings, standup meetings, and meetings between individual team members.

In the illustrated example, the correlation module 320 (which may correspond to the correlation module 710 of FIG. 7) receives the generated text transcripts 317 from the speech recognition module 315. In some embodiments, the correlation module 320 may identify, accumulate, combine, or/and correlate textual data that corresponds to the same project. The correlation module 320 may use entity recognition techniques to identify keywords or features that are relevant to a project. The identified keywords or features may include task names, timelines, team member names, and the like. Based on the identified keywords or features, the correlation module 320 may define a query or search criteria that identifies and extracts data related to the project from various sources or categories across the database 250. In some embodiments, the correlation module 320 may index and store the correlated data at a central location, such as the database 250 of FIG. 2. In some embodiments, the correlation module 320 may update the correlated data periodically to incorporate new data sources or to reflect new changes in the project.

In the illustrated example, the correlated data 322 for a given project is then processed by the dialogue determination module 325 (which may correspond to the dialogue determination module 715 of FIG. 7), where the dialogue determination module 325 categorizes the correlated data into multiple different dialogues, each dialogue comprising a set or plurality of pairs of sentences that correspond to a specific topic (or path) associated with the project. In some embodiments, issues that impact the overall progress or timeline of a project may arise from different topics (or paths), including delays in completing tasks (e.g., one uncompleted task blocks the beginning of another task), budget conflicts (e.g., limited budgets for multiple tasks), budget overruns or unexpected expenses, project scope changes, project requirement changes, personal performance (e.g., a team member fails to meet their deadline), technical challenges, external environment changes (e.g., competitors announce a launch of a similar product or service before the internal target date), equipment failures, personnel shortage, and the like. For example, the correlated data 322 for a given project may comprise a plurality of pairs of sentences related to three topics (or paths) associated with managing the project, including project scope changes, individual team members' performance, and technical challenges. In one such embodiment, the dialogue determination module 325 may process the correlated data 322, and group the sentences related to the project scope changes into a first dialogue, the sentences related to individual team member's performance into a second dialogue, and the sentences related to technical challenges into a third dialogue. Each dialogue will then be processed by the natural language module 335A to determine whether contradictory facts exist, and based on such contradictions or concerns, whether an issue that may impact the project process will be or should be raised, as discussed in more detail below.

In the illustrated example, each sentence related to a specific topic (or path) associated with the given project should be evaluated. In the context of a specific dialogue, each sentence is subject to pairwise comparison, such that each sentence is compared to each other sentence in the dialogue, one pair at a time (in sequence or in parallel). In the illustrated example, a specific pair (comprising a sentence S1 (330A), and a sentence S2 (330B)) is selected. In some aspects, all such pairs may be evaluated in parallel or sequence.

As illustrated in FIG. 3B, the sentence S1 is received and processed by a natural language processing (NLP) module 335A (which may correspond to the NLP module 735 of FIG. 7). In some embodiments, the NLP module may include a correction module (which may correspond to the correction module 750 of FIG. 7), a part-of-speech (POS) tagging module (which may correspond to the POS tagging module 740 of FIG. 7), a fact identifier (which may correspond to the fact identifier 745 of FIG. 7), and the like.

For conceptual clarity, in the illustrated example, the NLP modules 335A for sentence S1 and the NLP module 335B for sentence S2 are depicted as two discrete components. In some embodiments, the pair of sentences (S1 and S2) is received and processed by a single NLP module.

In some embodiments, the correction module may transform the sentence (e.g., S1 or S2) into a pre-processed format (e.g., 340A or 340B) so that vectorization of the sentence can be performed more efficiently. The correction module may filter noise in the text of a sentence (e.g., S1 or S2), analyze syntactic structure to rearrange a sentence, and/or modify the verb tense (e.g., "moved" to "move") and/or voice (e.g., from passive voice to active voice) used in a sentence. In some embodiments, the POS tagging module may assign a POS tag to each word in a sentence (e.g., S1 and S2). The POS tag is assigned based on the word's grammatical category and syntactic function in the sentence. Some examples of POS tags include ADJ for adjective, NOUN for noun, VERB for verb, ADV for adverb, and DET for determiner. In some embodiments, the fact identifier may analyze a sentence (e.g., S1 or S2) to identify a set of features and their corresponding values (e.g., 335A and 335B). For example, suppose sentence S1 states that "the project budget for task 1 has been increased to $400,000." Suppose further that sentence S2 states that "task 2's budget is reduced to $20,000." The fact identifier may analyze the sentences S1 and S2 to identify a set of features and their corresponding values, such as entity features (e.g., with a value of "project budget" and/or "task 1" in S1 330A and a value of "budget and/or task 2" for S2 330B), action features (S1: increase; S2: reduce), and/or measurement features (S1: $400,000; S2: $20,000). In some embodiments, the identified features and values are used to represent the sentences for more efficient vectorization. For example, sentence S1 may be represented as "project budget, task 1, increase, $400,000," and sentence S2 may be represented as "project budget, task 2, reduce, $20,000."

In the illustrated example, the pre-processed sentence (e.g., 340A and 340B), the assigned POS tags for each sentence (e.g., 345A and 345B), and/or the identified features and values (e.g., 355A and 355B) are combined to create an input to a transformer (e.g., 360A and 360B) (referred to in some embodiments as a transformer model) to generate a sentence vector (e.g., 365A and 365B). For example, as shown, sentence vector V1 is generated for sentence S1, and sentence vector V2 is generated for sentence S2. In some embodiments, the transformer may include a pre-trained word-embedding model, such as Word2Vec or Glove, or a transformer language model, such as BERT or GPT. In some embodiments, the assigned POS tags (e.g., 345A) may be appended to each of their corresponding words in the pre-processed sentence (e.g., 340A) to generate a word-POS sentence, which is used as input by the transformer (e.g., 360A) to generate a sentence vector (e.g., 365A). In some embodiments, the identified features and values (e.g., 355A) are used to represent a sentence (e.g., sentence S1), and processed by the transformer (e.g., 360A) as inputs to generate a sentence vector (e.g., 365A).

In some embodiments, the transformer 360A is the same as the transformer 360B. That is, the transformer 360A may be a copy or instance of the transformer 360B, and/or the transformers 360 may use the same parameters.

In the illustrated example, the generated sentence vectors V1 and V2 are then provided to the coherence determination module 370, which determines the similarity between sentences S1 and S2 using one or more similarity metrics. In some embodiments, the coherence determination module 370 may calculate the cosine of the angle (referred to in some aspects as cosine similarity) between two sentence vectors V1 and V2. In some embodiments, the coherence determination module 370 may calculate the Euclidean distance between the two sentence vectors V1 and V2. In some embodiments, similarity between two sentences S1 and S2 may be determined without transforming sentences into sentence vectors. For example, the coherence determination module 370 may calculate the edit distance between two sentences, where the edit distance measures the similarity between two sentences by counting the minimum number of edit operations (such as insertion, deletion, and substitution) required to transform one sentence into another. The larger the edit distance between two sentences, the less likely it is that the two sentences are similar. In some embodiments, coherence determination module 370 may calculate the Jaccard similarity between two sentences, which is the ratio of the number of words common to the sentences by the total number of words in the sentences. The values of Jaccard similarity ranges from 0 to 1, where 0 indicates the two sentences are identical while 1 means there is nothing common among the sentences.

As illustrated, by using one or more similarity metrics (such as cosine similarity or Euclidean distance), the coherence determination module 380 generates a coherence score 375 (also referred to in some aspects as a similarity score) for the pair of sentences S1 and S2. In some embodiments, the coherence/similarity score is generated based on the cosine similarity between the pair of sentence vectors V1 and V2, and if the coherence score 375 fails to satisfy one or more criteria (e.g., is less than a pre-defined threshold), the issue determination & classification module 380 determines that the pair of sentences S1 and S2 comprise contradictory facts and from which an issue 385 that may impact the project's progress will be raised. In some embodiments, the coherence score is generated based on the Euclidean distance (or other types of distance) between the pair of sentence vectors V1 and V2, and an issue 385 for the project is determined from the pair of sentences when the coherence/similarity score 375 satisfies other criteria (exceeds a pre-defined threshold).

In some embodiments, the issue determination & classification module 380 may assign a criticality tag to the determined issue 385 based on its corresponding coherence score and topic (or path). For example, an issue that has a lower coherence score (when the cosine similarity metric is used) to a high critical topic (such as budget changes) might be assigned a higher criticality tag than an issue that has a higher coherence score but pertains to a less critical topic (such as personal performance). Examples of criticality tags may include categorical labels, such as "high critical," "medium critical," or "low critical" (or "non-critical"). In some embodiments, the rules or criteria for assigning criticality tags may be determined based on a data-driven analysis of historical data. In some embodiments, a machine learning model may be trained to predict the criticality of a determined issue 385 based on the issue's coherence/similarity score and related topic (or path). A number of suitable machine learning algorithms or architectures can be used, depending on the particular implementation. In some embodiments, a decision tree architecture may be used. In some embodiments, a random forest architecture may be used, or any other suitable machine learning algorithm can be used. In some embodiments, a neural network architecture may be used for the machine learning model.

As illustrated, the determined issue 385 (with its criticality tag) is then provided to the meeting scheduler 390 (which may correspond to the meeting scheduler 755 of FIG. 7), which automatically schedules a project meeting to resolve the issue. In some embodiments, the meeting scheduler 390 may identify relevant participants for the project meeting based on a data-driven analysis of historical data, including identifying relevant stakeholders that may be directly or indirectly impacted by the determined issues, team members that have relevant knowledge and expertise to resolve the determined issues (e.g., the team members that uttered or typed the contradictory information), and/or team managers or directors that have authorization to approve amendments proposed during the meeting. In some embodiments, upon scheduling a project meeting, the meeting scheduler 390 may automatically send invitation links of the project meeting to all relevant participants or their associated devices (e.g., 220, 225, 235 and 240 of FIG. 2). Besides sending invitation links, in some embodiments, the meeting scheduler 390 may generate a meeting agenda for the scheduled project meeting based on the determined issue and its corresponding topic and coherence score. The agenda may include the purpose and goals of the meeting, including the issue to be addressed in the meeting and any desired outcomes. In some embodiments, the agenda may include background information for the determined issue to ensure all participants have a common understanding before attending the meeting. The background information may be generated automatically by extracting the key words from the determined issue and searching the database (e.g., 250 of FIG. 2) to retrieve information that is relevant to the determined issue and its related topic. When multiple issues are determined, in some embodiments, the issues may be put in an ordered list and ranked based on their respective criticality tags.

In some embodiments, the meeting scheduler 390 may take different actions for different issues based on their criticality tags. For example, in some embodiments, a project meeting to address an issue with a "high critical" tag will be scheduled within one week from the day the issue is identified, and the invitation links sent to stakeholders will be flagged as "important." Further, in some embodiments, when scheduling a project meeting for a high-critical issue, the system may escalate the issue to higher levels of management to ensure it receives the necessary attention and resources. For example, the system may invite (e.g., sending meeting links) the project manager or team leader who has authority to approve changes or allocate resources. The system may also invite additional individuals, like experts or external consultants, who have specialized knowledge or skills to help resolve the high-critical issue more efficiently. For an issue with a "medium critical" or "low critical" tag, the time requirement to schedule a project meeting may be relaxed. For example, a project meeting for a medium-critical issue may be automatically scheduled within the next two weeks from the time the issue is identified. A project meeting for a low-critical (or non-critical) issue may be optionally scheduled, depending on the project manager's decision.

Figure 3C:
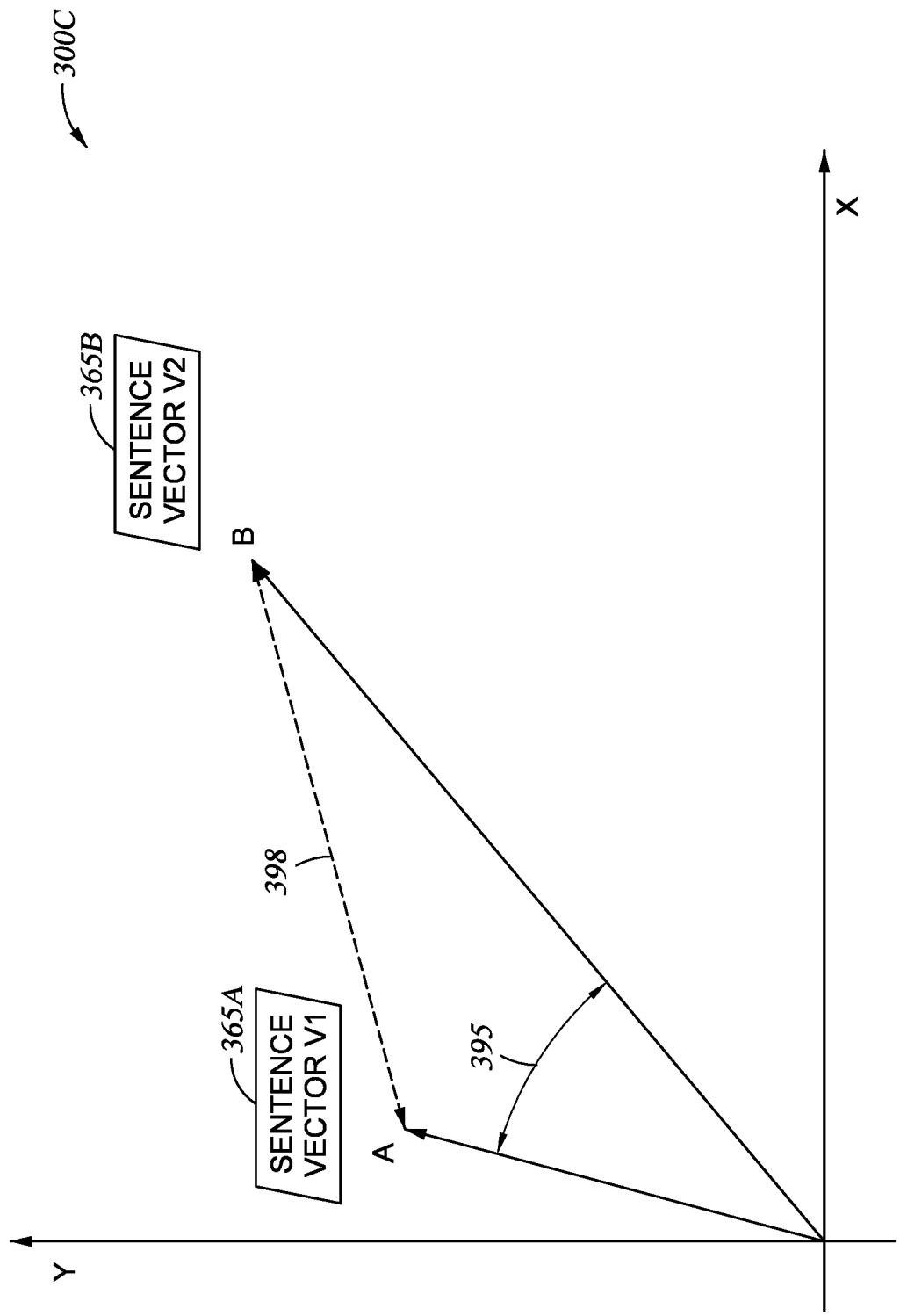
FIG. 3C depicts an example process for determining similarity between two sentence vectors, according to some embodiments of the present disclosure.

FIG. 3C depicts an example process for determining similarity between two sentence vectors, according to some embodiments of the present disclosure. In the illustrated example, the sentence vector V1 365A (generated by processing sentence S1) and sentence vector V2 365B (generated by processing sentence S2) are projected/mapped into the multidimensional vector space, and different similarity metrics (e.g., cosine similarity, Euclidean distance, and the like) may be used to measure the similarity between the two sentences S1 and S2. The operations for determining similarity between two sentence vectors may be performed by a coherence determination module (e.g., 725 of FIG. 7).

In the illustrated example, the arc 395 represents the angle between two sentences vectors V1 and V2, and the cosine similarity that measures the cosine of the angle may be calculated to represent the gap or semantic space between the two sentences S1 and S2. Cosine similarity may range from 0 to 1, with 0 indicating no similarity, and 1 indicating completely similar.

In the illustrated example, the dash line 398 represents the Euclidean distance between the two sentence vectors V1 and V2. Euclidean distance measures the straight-line distance between two vectors, and may range from 0 to positive infinity, with 0 indicating completely similar, and positive infinity indicating completely dissimilar. The larger the Euclidean distance between two sentences vectors, the less likely it is that the two sentences are similar. In some embodiments, Manhattan distance may be used to measure the similarity between the two sentence vectors, which sums the absolute differences between sentence vectors and ranges from 0 to positive infinity, with 0 indicating completely similar, and positive infinity indicating completely dissimilar.

Figure 4:
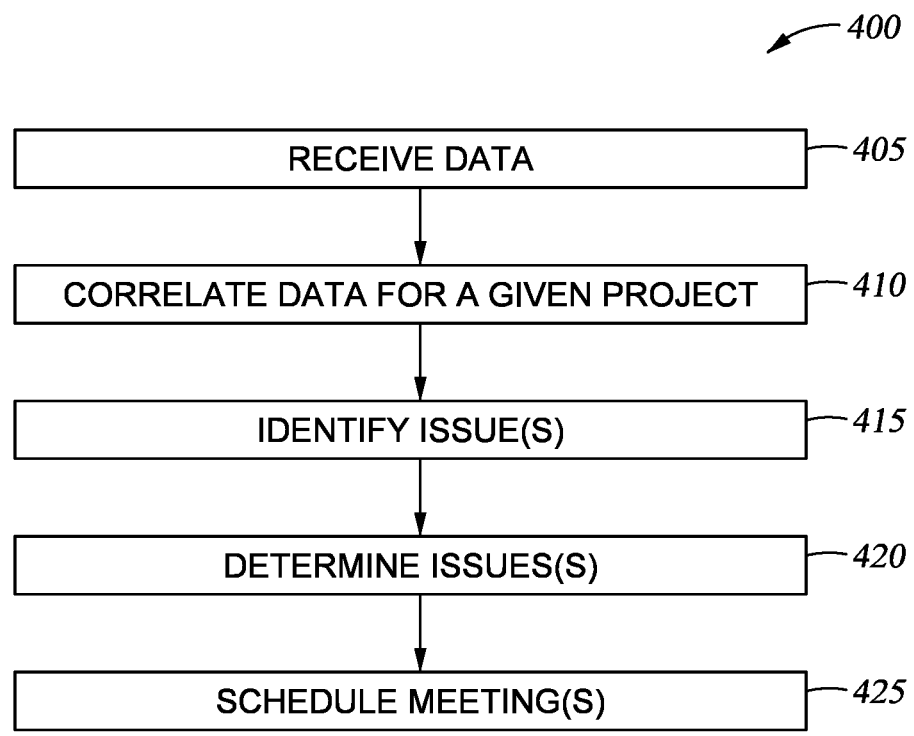
FIG. 4 depicts an example method for extracting and analyzing embedded context for dynamic scheduling, according to some embodiments of the present disclosure.

FIG. 4 depicts an example method for extracting and analyzing embedded context for dynamic scheduling, according to some embodiments of the present disclosure. In some embodiments, the method 400 may be performed by a computing system (e.g., 700 of FIG. 7) in a device, such as the user device 225, or the server 245 of FIG. 2.

The method begins at block 405, where a computing system receives a corpus of text data generated or collected from various sources (collected from different user devices), such as emails, chat logs, project runbooks, forum postings, meeting minutes, project plans, status reports, task lists, and/or audio/video meeting records. In some embodiments, the audio/video records may be converted into text data by a speech recognition module (e.g., 705 of FIG. 7) using one or more speech-to-text algorithms/models.

At block 410, the computing system processes the corpus of text data, and correlates (or aggregates) data that corresponds to the same project. In some embodiments, the computing system may use entity recognition techniques to identify keywords or features (such as task names, timelines, team member names) that are relevant to a specific project. Relying on the identified keywords or features, the system may define a query or search criteria that identifies and extracts data related to the project from the corpus of text data generated from various sources. In some embodiment, the computing system may clean and reformat the correlated data, such as by converting the data to a uniform format, or removing irrelevant or redundant information. In some embodiments, the computing system may index and store the correlated data in a central location, such as the database 250 of FIG. 2, which may be updated periodically to incorporate new data sources or to reflect new changes in the project. In some embodiments, the operations for correlating text data for a specific project may be performed by the correlation module (e.g., 710 of FIG. 7) in a computing system.

Figure 5:
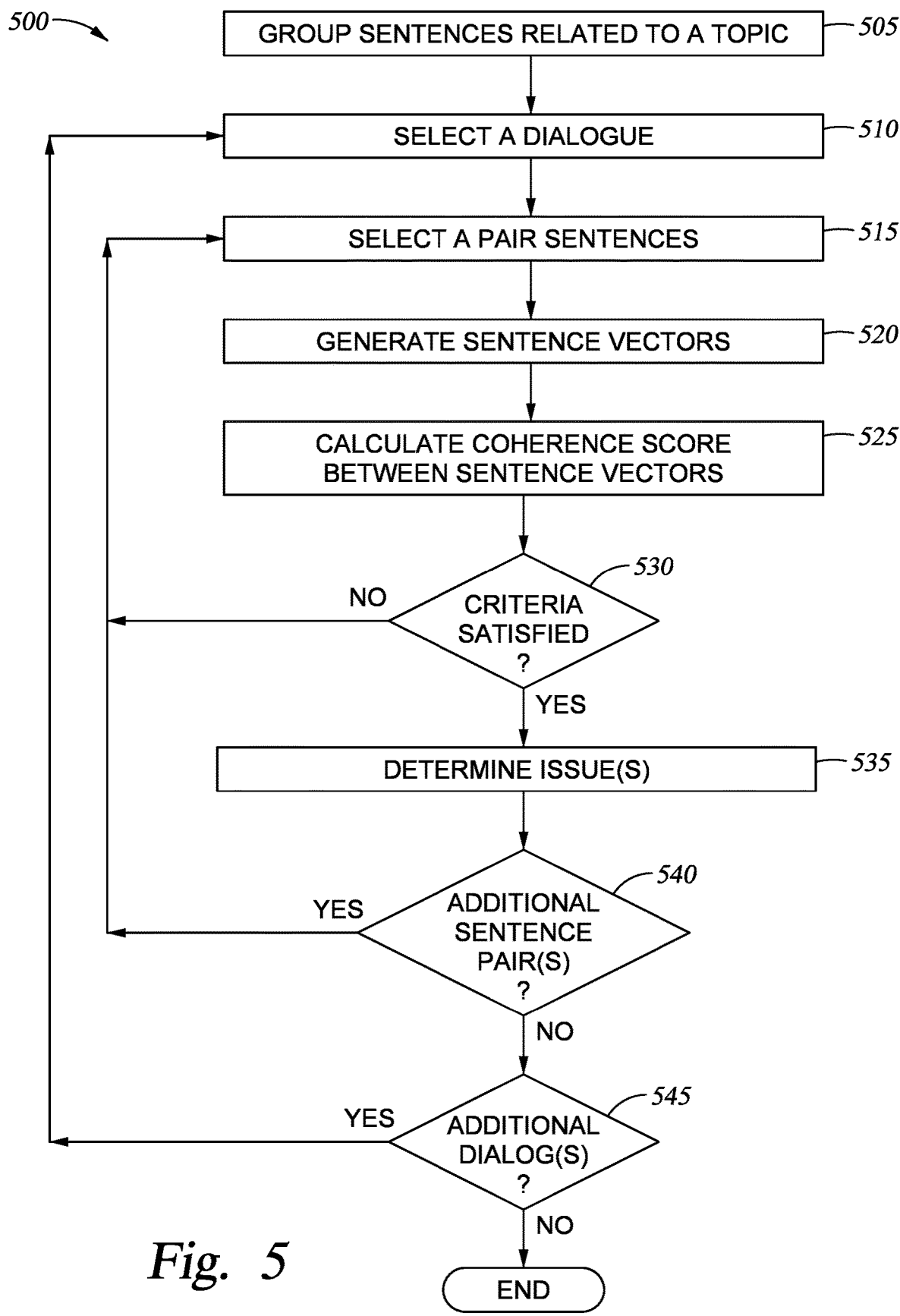
FIG. 5 depicts an example method for identifying and determining issues related to a specific topic for a given project, according to some embodiments of the present disclosure.

At block 415, the computing system proceeds to identify any issue(s) that may impede or block the progress of a project by analyzing the correlated data generated for this project, as discussed in more detail in FIG. 5.

At block 420, the computing system determines whether contradictory facts may exist and which issues that may impact the project's progress may be raised. In some aspects, the computing system determines the existence of issues by comparing each of their corresponding coherence scores with a pre-defined threshold, as discussed in more detail in FIG. 5. In addition to determining the existence of issues, in some embodiments, the computing system may further assign a criticality tag to the determined issues based on their corresponding coherence scores and topics. For example, criticality tags may include "high critical," "medium critical," or "low critical" (or "non-critical"). An issue having a low coherence score (when the cosine similarity metric is used) but corresponding to a high critical topic (or path), such as budget changes, may be assigned a high critical tag. An issue having a high coherence score (when cosine similarity metric is used) but corresponding to a relatively low critical topic (or path), such as personal performance, may be assigned a "medium critical" or "low critical" (or "non-critical") tag. In some embodiments, the rules or criteria for assigning criticality tags may be determined based on a data-driven analysis of historical data. In some embodiments, a machine learning model may be trained to predict the criticality tag based on the topic and the coherence score of the pair of sentences S1 and S2. In some embodiments, the operations for determining the existence of issues based on coherence scores are performed by an issue determination & classification module (e.g., 730 of FIG. 7).

At block 425, the computing system automatically schedules project meetings to resolve these determined issues. In some embodiments, the operations for scheduling project meetings are performed by a meeting scheduler (e.g., 755 of FIG. 7). As discussed above, in some embodiments, the meeting scheduler may automatically send invitation links of the scheduled project meeting to all participants. In some embodiments, the meeting scheduler may generate a meeting agenda for the scheduled meeting based on the determined issues and their corresponding topic and coherence scores. The meeting agenda may include an ordered list of the determined issues, which are ranked based on their respective criticality tags. In some embodiments, different project meetings may be set up for different issues based on their respective criticalities. The computing system may first group the determined issues based on their criticality tags. For example, high-critical issues may be grouped together, and medium- critical issues may be grouped together, as well as low-critical (or non-critical) issues may be grouped together. The system then schedules separate project meetings for each group of issues. For example, the system may schedule a meeting for the group of high-critical issues within one week from the time the issues are identified, and mark the meeting as "important" in each invited participant's calendar. For the group of medium-critical issues, the system may schedule a meeting within two weeks from the time the issues are identified, and for the group of low-critical (or non-critical) issues, the system may optionally schedule a meeting, following a project manager's instruction.

FIG. 5 depicts an example method 500 of identifying and determining issues related to a specific topic, according to some embodiments of the present disclosure. In some embodiments, the method 500 may be performed by a computing system (e.g., 700 of FIG. 7) in a device, such as the user device 225, or the server 245 of FIG. 2. In some embodiments, the method 500 provides additional detail for blocks 415 and 420 of FIG. 4, above.

The method 500 begins at block 505, where a computing system receives the correlated text data generated for a given project (in some embodiments, the correlated data may be generated at block 410 of FIG. 4). The correlated data may comprise sentences or statements related to different topics (or paths) associated with managing a project, including but not limited to delays in completing tasks (e.g., where one uncompleted task blocks the beginning of another task), budget conflicts (e.g., limited budgets for multiple tasks), budget overruns or unexpected expenses, project scope changes, project requirement changes, personal performance (e.g., a team member fails to meet their deadline), technical challenges, external environment changes (e.g., competitors announce a launch of a similar product or service), equipment failures, personnel shortages, and the like. In order to more accurately determine the existence of an issue and its respective criticality, in some embodiments, the computing system may delineate the correlated data into one or more different dialogues. Each dialogue may correspond to a single topic, and comprise a plurality of sentences related to that topic. For example, the correlated data for a project may comprise sentences related to three topics associated with managing this project, including project scope changes, individual team member's performance, and technical challenges. The computing system may process the correlated data, and generate three dialogues, where the first dialogue aggregates the sentences related to the project scope changes, the second dialogue aggregates the sentences related to the individual team member's performance, and the third dialogue aggregates the sentences related to the technical challenges. In some embodiments, the computing system may use pre-trained machine learning models to identify the underlying topics in the correlated text data and assign (or predict) a probability to each sentence for each topic. The system may assign the sentences to specific topics when the predicted probabilities are above a pre-defined threshold. The sentences assigned to each topic may then be grouped into a dialogue. In some embodiments, the operations for generating dialogues are performed by a dialogue determination module (e.g., 715 of FIG. 7).

At block 510, the computing system selects a dialogue from one of the generated dialogues. The selected dialogue may comprises a plurality of sentences related to a specific topic associated with the given project. Each sentence in the selected dialogue undergoes pairwise comparison with each other sentence in the dialogue, considering one pair at a time (in sequence or in parallel). At block 515, the computing system selects a pair of sentences from the selected dialogue. The pair of sentence may comprise a sentence S1 (e.g., 330A of FIG. 3B) and a sentence S2 (e.g., 330B of FIG. 3B). In some aspects, the pair of sentences may be selected using any suitable technique, including randomly or pseudo-randomly, as the computing system evaluates all pairs of sentences during the method 500. That is, for each respective sentence, the computing system may compare it against each other sentence in the dialogue using the method 500. Though a sequential process (selecting and evaluating each pair of sentences in turn) is depicted for conceptual clarity, in some aspects, the computing system may evaluate some or all of the pairs in parallel.

The method 500 then proceeds to block 520, where the pair of sentences S1 and S2 are processed by pre-trained word-embedding models or transformer language models to generate sentence vectors V1 and V2. In some embodiments, before vectorization, the sentences S1 and S2 may first be processed by a natural language module (e.g., 735 of FIG. 7). The natural language module may comprise a correction module (e.g., 750 of FIG. 7), a fact identifier (745 of FIG. 7) and a POS tagging module (740 of FIG. 7). The correction module may transform a sentence (e.g., S1 or S2) into a pre-processed format, by filtering noise in the text of the sentence, analyzing the syntactic structure to rearrange the sentence, and/or revising the verb tense and voice in the sentence. The POS tagging module may assign a POS tag to each word used in the sentence, and fact identifier may analyze the sentence to identify a set of features and their corresponding values. Examples of features may include entities, actions, measurements, functions, or characteristics.

In some embodiments, the pre-processed sentence, the assigned POS tags, as well as the identified features and values, may be combined as inputs to generate a sentence vector, using word-embedding or transformer language models. In some embodiments, other models may be used to convert a sentence into a sentence vector, such as the bag-of-word model, and the Term Frequency and Inverse Document Frequency (TF-IDF) model. In some embodiments, the operations for generating sentence vectors may be performed by a transformer (e.g., 720 of FIG. 7).

At block 525, the computing system calculates a coherence/similarity score for the selected pair of sentences. The coherence/similarity score indicates the similarity between the two sentences S1 and S2. To calculate the coherence score, one or more metrics may be used. In some embodiments, the cosine similarity between two sentence vectors V1 and V2 may be used to represent the coherence score for the pair of sentences. The cosine similarity may range from 0 to 1, where 0 indicates the two sentences are completely dissimilar, and 1 indicates the two sentences are completely similar. In some embodiments, the Euclidean distance between two sentence vectors V1 and V2 may be used to represent the coherence score for the pair of sentences. The Euclidean distance may range from 0 to positive infinity, where 0 indicates the two sentences are completely similar, and positive infinity indicates the two sentences are completely dissimilar. The larger the Euclidean distance between two sentence vectors, the less likely it is that the two sentences are similar. In some embodiments, a combination of metrics may be used to generate an overall coherence score (e.g., combining the cosine score and the Euclidean distance into a single metric). In some embodiments, the operations for calculating coherence scores between sentence vectors are performed by a coherence determination module (e.g., 725 of FIG. 7). In some embodiments, the coherence/similarity score between a pair of sentences S1 and S2 may be determined without transforming sentences to sentence vectors.

The method 500 then continues to block 530, where the computing system compares the coherence/similarity score with one or more pre-defined criteria, to determine whether the pair of sentences S1 and S2 comprises contradictory facts from which an issue that may impact (delay or block) the project's progress would arise. In some embodiments, the cosine similarity between two sentence vectors V1 and V2 may be used to represent the coherence score for the pair of sentences, and the pre-defined criteria are deemed satisfied when the coherence score is lower than a pre-defined threshold. In some embodiments, the Euclidean distance (or other types of distance) between two sentence vectors V1 and V2 may be used to represent the coherence score for the pair of sentences, and the pre-defined criteria are deemed satisfied when the coherence score exceeds a pre-defined threshold. If the computing system determines the pre-defined criteria are satisfied, the method 500 continues to block 535, where the existence of an issue is determined. If, at block 530, the computing system determines the pre-defined criteria are not satisfied, the method 500 returns to block 515, where the computing system analyzes another pair of sentences from the selected dialogue to determine whether they comprise contradictory facts.

At block 540, the computing system determines whether there are additional pairs of sentences within the selected dialogue that have not been analyzed. If yes, the method 500 returns to block 515. Otherwise, the method 500 proceeds to block 545, where the computing system checks if there are additional generated dialogues for a given project that have not been analyzed. If yes, the method 500 returns to block 510, where a new dialogue (different from the one that has been analyzed) is selected. Otherwise, the computing system concludes that all dialogues generated from the correlated text data for a given project have been analyzed, and the existence of issues (arising from different topics or paths) that may impact the progress or timeline of the project, if any, has been determined. In some embodiments, the determined issues for the project may be provided to a meeting scheduler, which automatically schedules project meetings to resolve these determined issues based on their respective criticalities.

Figure 6:
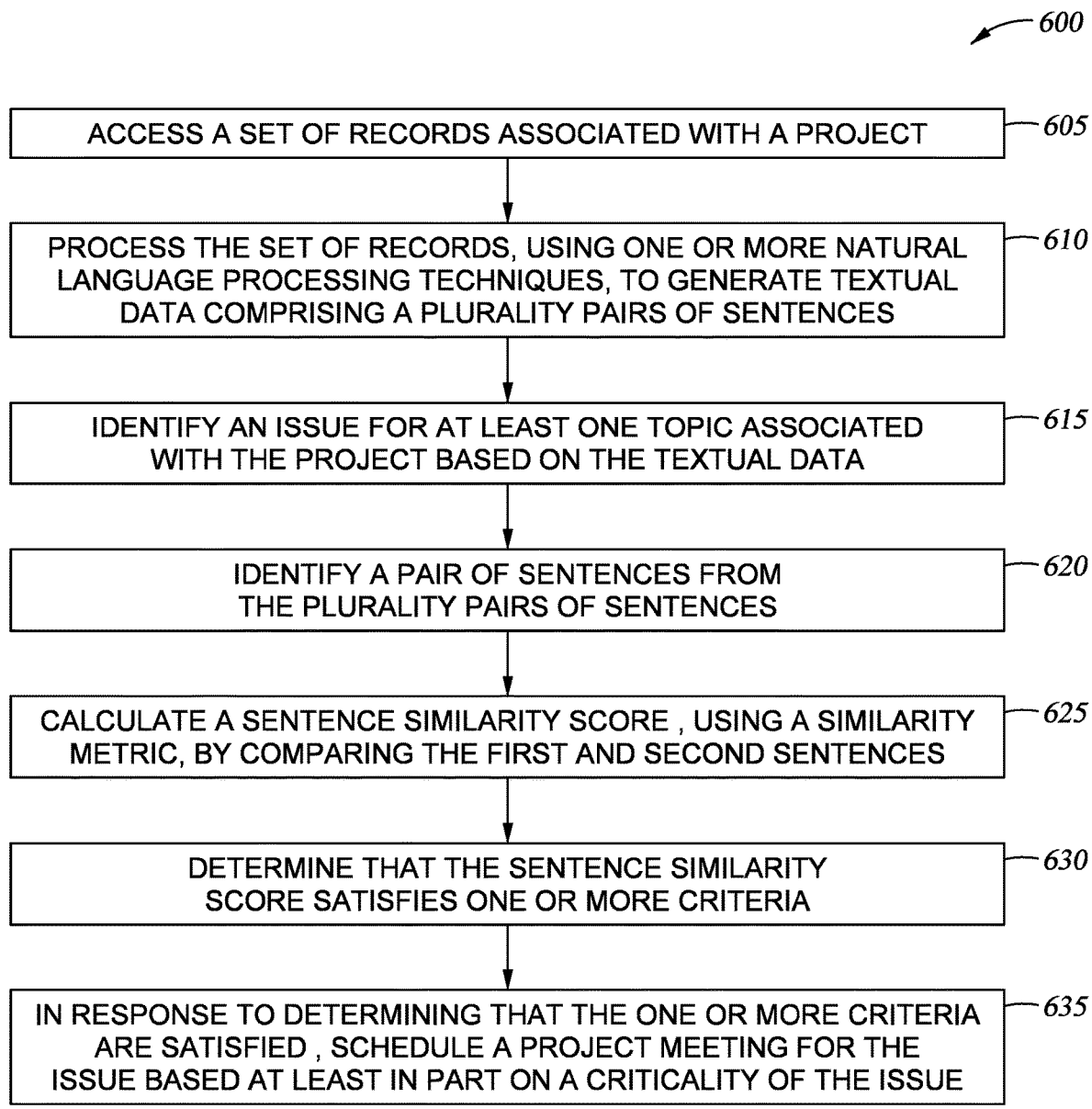
FIG. 6 is a flow diagram depicting an example method for automated issue identification and dynamic scheduling, according to some embodiments of the present disclosure.

FIG. 6 is a flow diagram depicting an example method 600 for automated issue identification and dynamic scheduling, according to some embodiments of the present disclosure.

At block 605, a system (e.g., the computing system 700 of FIG. 7) accesses a set of records (e.g., 305, 310 of FIG. 3A) associated with a project. In some embodiments, the set of records is transmitted from different user devices (e.g., 220, 225, 235, and 240 of FIG. 2) and saved in a central database (e.g., 250 of FIG. 2). In some embodiments, the set of records comprises at least one of an audio record, a video record, and/or a textual record.

At block 610, the system processes the set of records (e.g., 305, 310 of FIG. 3A) by using one or more natural language processing techniques to generate textual data (e.g., 317 of FIG. 3A), which comprises a plurality of pairs of sentences. In some embodiments, the natural processing techniques may comprise speech-to-text transcription, keyword extraction and matching, pattern identification, and/or text classification and clustering. In some embodiments, the system transcribes speech in video/audio records (e.g., 305 of FIG. 3) into text using one or more speech-to-text algorithms/models.

At block 615, the system identifies an issue (e.g., 385 of FIG. 3B) for at least one topic associated with the project based on the textual data (e.g., 317 of FIG. 3A). The process of identifying the issue comprises several steps, as depicted by blocks 520-530.

At block 620, the system identifies a pair of sentences (e.g., 330A-B of FIG. 3A) from the plurality of pairs of sentences (e.g., 322 of FIG. 3A), where the pair of sentences comprises a first sentence and a second sentence.

At block 625, the system calculates a sentence similarity score (e.g., 375 of FIG. 3) by comparing the first and second sentences, using a similarity metric. In some embodiments, the similarity metric may comprise at least one of an angle similarity metric (e.g., cosine similarity, Jaccard similarity), and/or a distance similarity metric (Euclidean distance, edit distance). In some embodiments, before calculating the sentence similarity score, the system converts the first and second sentences into a first sentence vector and a second sentence vector, respectively. (e.g., 365A-B of FIG. 3B) using one or more transformer language models. In some embodiments, the system may calculate the sentence similarity score by projecting the generated first and second sentence vectors to a multidimensional space (e.g., 365A-B of FIG. 3C).

At block 630, the system determines that the sentence similarity score satisfies (e.g., 375 of FIG. 3) one or more criteria. In some embodiments, cosine similarity (ranges from 0 to 1 with 0 indicating completely dissimilar and 1 indicating completely similar) may be used to compute the similarity score between the first and second sentences, and the criteria are satisfied when the similarity score is lower than a pre-defined threshold. In some embodiments, Euclidean distance (ranges from 0 to positive infinity with 0 indicating completely similar and positive infinity indicating completely dissimilar) may be used to compute the similarity score between the first and second sentences, and the criteria are satisfied when the similarity score exceeds a pre-defined threshold.

At block 635, in response to determining that one or more criteria are satisfied, the system schedules a project meeting for the issue (e.g., 385 of FIG. 3B) based at least in part on a criticality of the issue. In some embodiments, the system sends invitation links of the project meeting to a plurality of participants identified based on the textual data. In other embodiments, the system generates an agenda comprising the determined issue related to at least one topic associated with the project. In some embodiments, more than one issue for the project is identified and determined by processing the textual data (e.g., 317 of FIG. 3A), and the system generates an ordered agenda that sorts the determined issues based on their respective criticalities.

FIG. 7 depicts an example computing system for automated issue identification and dynamic scheduling, according to some embodiments of the present disclosure. The computing system 700 may communicate with a database 250 via a network 210. The computing system can be embodied as any computing device, such as the server 245, or the user devices 220-240 of FIG. 2.

In the illustrated example, the computing system 700 includes a speech recognition module 705, a correlation module 710, a dialogue determination module 715, a transformer 720, coherence determination module 725, an issue determination & classification module 730, a natural language processing (NLP) module 735, and a meeting scheduler 755. The NLP module 735 includes a POS tagging module 740, a fact identifier 745, and a correction module 750. Though depicted as discrete components for conceptual clarity, in some embodiments, the operations of the depicted components (and others not depicted) may be combined or distributed across any number and variety of components, and may be implemented using hardware, software, or a combination of hardware and software.

The speech recognition module 705 may take the audio or video records as input and convert the speech in these records into text by using one or more speech-to-text algorithms/models. The audio or video records may come from a variety of sources, such as project kick-off meetings, weekly project update meetings, standup meetings, and meetings between individual team members. In some embodiments, the speech-to-text algorithms/models used by the speech recognition module 315 may correspond to Hidden Markov Models (HMM), Gaussian Mixture Models (GMM), recurrent neural network (RNN) models, or hybrid models combining two or more stated models.

The correlation module 710 may take text data from various sources as inputs and extract and correlate text data that corresponds to the same project. The correlation module 710 may clean or convert the extracted text data to a uniform format. The correlation module 710 may remove irrelevant or redundant information. The correlation module 710 may index. optimize and store the correlated data in a central database. In some embodiments, the correlation module 710 may update the correlated data periodically to incorporate new data sources or to reflect new changes in the project.

The dialogue determination module 715 may define different topics (or paths) to categorize the correlated data for a specific project. For example, the module may define topics such as task dependency (one uncompleted task block the beginning of another task), budget conflicts (limited budgets for multiple tasks), project budget changes, project scope changes, project requirement changes, personal performance (a team member falls to meet his deadline), external environment changes (e.g., a competitor announces to launch a similar product or service before your target date), equipment failures, personnel shortage, etc. Based on the pre-defined topics (or paths), the dialogue determination module 715 may delineate the correlated data into different dialogues. Each dialogue may focus on a single topic, and may comprise a plurality of sentences related to that topic.

The natural language processing module 735 may pre-process the text in the sentences before sentence vectorization. In the illustrated example, the natural language module 735 may include a correction module 750, a fact identifier 745, and a POS tagging module 740. In some embodiments, the correction module 750 may transform a sentence to a pre-processed format so that the generated sentence vector may capture the semantic meaning of the sentence more accurately. In some embodiments, the correction module 750 may filter noise in the text of a sentence. For example, the correction module 750 may convert all the text to lowercase, and remove stop words and inconsequential phrases that are commonly used across sentences but provide little semantic meaning (such as the words "of", "the", "that"). In some embodiments, the correction module 750 may analyze the syntactic structure to rearrange the sentence, and modify the verb tense (e.g., "moved" to "move") and voice (e.g., from passive voice to active voice). In some embodiments, the POS tagging module 740 may assign a POS tag to each word in a sentence. The POS tags may be appended to each of their corresponding words to generate a word-POS sentence, which is then processed by a transformer 720 as inputs to generate a sentence vector. In some embodiments, the fact identifier 745 may analyze a sentence to identify a set of features and their corresponding values, which are then processed by a transformer 720 as inputs to generate a sentence vector. In some embodiments, the transformer 720 may include a pre-trained word-embedding model, such as Word2Vec or Glove, or a transformer language model, such as BERT or GPT.

The coherence determination module 725 may calculate a coherence/similarity score to measure the similarity between a pair of sentences, and one or more similarity metrics may be used, such as cosine similarity or Euclidean distance. Upon determining that the calculated coherence/similarity score for a pair of sentences is lower than a pre-defined threshold (when the cosine similarity metric is used), the issue determination & classification module 730 may determine that an issue that affects a project's progress is raised from that pair of sentences. In some embodiments, the issue determination & classification module 730 may assign a criticality tag to each determined issue based on its coherence score and related topic.

The meeting scheduler 755 may schedule project meetings to resolve the determined issues. As stated above, in some embodiments, the meeting scheduler 655 may identify relevant participants for a project meeting, and the meeting scheduler may automatically send invitation links to these identified participants. Besides sending invitation links, in some embodiments, the meeting scheduler 755 may generate a meeting agenda for a scheduled project meeting, based at least in part on the determined issues that will be discussed at the meeting.

In the preceding, reference is made to embodiments presented in this disclosure. However, the scope of the present disclosure is not limited to specific described embodiments. Instead, any combination of the features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages discussed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

While the foregoing is directed to embodiments of the present invention, other and further embodiments of the invention may be devised without departing from the basic scope thereof, and the scope thereof is determined by the claims that follow.

What is claimed is:

1. A method comprising:
   accessing a set of records associated with a project;
   processing the set of records, using one or more natural language processing (NLP) techniques, to generate textual data comprising a plurality of pairs of sentences corresponding to one or more topics associated with the project;
   identifying an issue for at least one topic associated with the project based on the textual data, comprising:
   identifying a pair of sentences from the plurality of pairs of sentences, wherein the pair of sentences comprises a first sentence and a second sentence,
   converting the first sentence into a first sentence vector and converting the second sentence into a second sentence vector using a language transformer machine learning (ML) model based on identifying respective part-of-speech (POS) tags of the first and second sentences,
   calculating a sentence similarity score, using a similarity metric, by comparing the first and second sentence vectors, and
   determining that the sentence similarity score satisfies one or more criteria; and
   in response to determining that the one or more criteria are satisfied, scheduling a project meeting for the issue based at least in part on a criticality of the issue.

2. The method of claim 1, furthering comprising delineating the textual data into a plurality of dialogues, wherein each of the plurality of dialogues corresponds to a respective topic of a plurality of topics identified for the project.

3. The method of claim 1, wherein scheduling the project meeting for the issue comprises:
   sending invitation links of the project meeting to a plurality of participants identified based on the textual data, and
   generating an ordered agenda comprising the issue identified for the at least one topic and one or more relevant records.

4. The method of claim 1, wherein the set of records comprises at least one of: (i) an audio record, or (ii) a video record, or (iii) a textual record.

5. The method of claim 1, wherein the similarity metric comprises one of:
   (i) an angle similarity metric, or (ii) a distance similarity metric.

6. The method of claim 1, wherein converting the first sentence into the first sentence vector, and converting the second sentence into the second sentence vector comprises:
   extracting a plurality of features from the first and second sentences,
   generating the first sentence vector based on a first set of values using the language transformer ML model, wherein each respective value of the first set of values corresponds to a respective feature of the plurality of features and is identified by processing the first sentence, and
   generating the second sentence vector based on a second set of values using the language transformer ML model, wherein each respective value of the second set of values corresponds to a respective feature of the plurality of features and is identified by processing the second sentence.

7. The method of claim 1, furthering comprising:
   identifying a plurality of issues for the project by processing the textual data, wherein each respective issue of the plurality of issues is assigned a respective criticality, scheduling a projecting meeting for the plurality of issues, further comprising:
   sending invitation links of the project meeting to a plurality of participants identified based on the textual data, and
   generating an ordered agenda comprises the plurality of issues for the project, wherein the plurality of issues are ordered based on the respective criticality corresponding to each respective issue.

8. The method of claim 1, wherein the one or more NLP techniques comprises at least one of: (i) speech-to-text transcription; (ii) keyword extraction and matching; (iii) pattern identification; or (iv) text classification and clustering.

9. A system, comprising:
   one or more memories collectively containing one or more programs; and
   one or more processors, wherein the one or more processors are configured to, individually or collectively, perform an operation comprising:
   accessing a set of records associated with a project;
   processing the set of records, using one or more natural language processing (NLP) techniques, to generate textual data comprising a plurality of pairs of sentences corresponding to one or more topics associated with the project;
   identifying an issue for at least one topic associated with the project based on the textual data, comprising:
   identifying a pair of sentences from the plurality of pairs of sentences, wherein the pair of sentences comprises a first sentence and a second sentence,
   converting the first sentence into a first sentence vector and converting the second sentence into a second sentence vector using a language transformer machine learning (ML) model based on identifying respective part-of-speech (POS) tags of the first and second sentences,
   calculating a sentence similarity score, using a similarity metric, by comparing the first and second sentence vectors, and
   determining that the sentence similarity score satisfies one or more criteria; and
   in response to determining that the one or more criteria are satisfied, scheduling a project meeting for the issue based at least in part on a criticality of the issue.

10. The system of claim 9, wherein scheduling the project meeting for the issue comprises:
    sending invitation links of the project meeting to a plurality of participants identified based on the textual data, and
    generating an ordered agenda comprising the issue identified for the at least one topic and one or more relevant records.

11. The system of claim 9, wherein the one or more NLP techniques comprises at least one of: (i) speech-to-text transcription; (ii) keyword extraction and matching; (iii) pattern identification; or (iv) text classification and clustering.

12. The system of claim 9, furthering comprising:
identifying a plurality of issues for the project by processing the textual data, wherein each respective issue of the plurality of issues is assigned a respective criticality,
scheduling a projecting meeting for the plurality of issues, further comprising:
sending invitation links of the project meeting to a plurality of participants identified based on the textual data, and
generating an ordered agenda comprises the plurality of issues for the project, wherein the plurality of issues are ordered based on the respective criticality corresponding to each respective issue.

13. The system of claim 9, wherein the operation further comprises delineating the textual data into a plurality of dialogues, wherein each of the plurality of dialogues corresponds to a respective topic of a plurality of topics identified for the project.

14. The system of claim 9, wherein the similarity metric comprises one of: (i) an angle similarity metric, or (ii) a distance similarity metric.

15. The system of claim 9, wherein the set of records comprises at least one of: (i) an audio record, or (ii) a video record, or (iii) a textual record.

16. The system of claim 9, wherein converting the first sentence into the first sentence vector, and converting the second sentence into the second sentence vector comprises:
extracting a plurality of features from the first and second sentences,
generating the first sentence vector based on a first set of values using the language transformer ML model, wherein each respective value of the first set of values corresponds to a respective feature of the plurality of features and is identified by processing the first sentence, and
generating the second sentence vector based on a second set of values using the language transformer ML model, wherein each respective value of the second set of values corresponds to a respective feature of the plurality of features and is identified by processing the second sentence.

17. A computer program product for scheduling project meetings, the computer program product comprising:
a computer-readable storage medium having computer-readable program code embodied therewith, the computer-readable program code executable by one or more computer processors to:
access a set of records associated with a project;
process the set of records, using one or more natural language processing (NLP) techniques, to generate textual data comprising a plurality of pairs of sentences corresponding to one or more topics associated with the project;
identify an issue for at least one topic associated with the project based on the textual data, comprising:
identifying a pair of sentences from the plurality of pairs of sentences, wherein the pair of sentences comprises a first sentence and a second sentence,
converting the first sentence into a first sentence vector and converting the second sentence into a second sentence vector using a language transformer machine learning (ML) model based on identifying respective part-of-speech (POS) tags of the first and second sentences,
calculating a sentence similarity score, using a similarity metric, by comparing the first and second sentence vectors, and
determining that the sentence similarity score satisfy one or more criteria; and
in response to determining that the one or more criteria are satisfied, schedule a project meeting for the issue based at least in part on a criticality of the issue.

18. The computer program product of claim 17, wherein the computer-readable program code executable by the one or more computer processors to schedule the project meeting for the issue further comprising:
sending invitation links of the project meeting to a plurality of participants identified based on the textual data, and
generating an ordered agenda comprising the issue identified for the at least one topic and one or more relevant records.

19. The computer program product of claim 17, wherein converting the first sentence into the first sentence vector, and converting the second sentence into the second sentence vector comprises:
extracting a plurality of features from the first and second sentences,
generating the first sentence vector based on a first set of values using the language transformer ML model, wherein each respective value of the first set of values corresponds to a respective feature of the plurality of features and is identified by processing the first sentence, and
generating the second sentence vector based on a second set of values using the language transformer ML model, wherein each respective value of the second set of values corresponds to a respective feature of the plurality of features and is identified by processing the second sentence.

20. The computer program product of claim 17, wherein the one or more NLP techniques comprises at least one of: (i) speech-to-text transcription; (ii) keyword extraction and matching; (iii) pattern identification; or (iv) text classification and clustering.

* * * * *